United States Patent [19]

Brown et al.

[11] Patent Number: 5,428,530
[45] Date of Patent: Jun. 27, 1995

[54] AIRBORNE REACTIVE THREAT SIMULATOR

[75] Inventors: Kevin D. Brown, Burke, Va.; David D. Hill, Bowie, Md.; Albert C. McGuire, Springfield, Va.

[73] Assignee: Kaman Sciences Corporation, Colorado Springs, Colo.

[21] Appl. No.: 878,955

[22] Filed: May 5, 1992

[51] Int. Cl.⁶ .................. G09B 9/00; F41A 33/00
[52] U.S. Cl. ..................... 364/424.01; 364/578; 342/13; 342/169; 434/14
[58] Field of Search .............. 364/578, 516, 423; 235/411; 434/11, 14, 35, 39; 342/169-172, 165, 13, 15

[56] References Cited

U.S. PATENT DOCUMENTS

| | | | |
|---|---|---|---|
| 3,754,267 | 8/1973 | Walters et al. | 343/705 |
| 4,057,913 | 11/1977 | Eisenberg | 35/12 B |
| 4,176,468 | 12/1979 | Marty, Jr. | 35/10.4 |
| 4,192,082 | 3/1980 | Deaton et al. | 434/2 |
| 4,346,386 | 8/1982 | Francis et al. | 343/765 |
| 4,666,407 | 5/1987 | Jones | 342/169 X |
| 4,729,737 | 3/1988 | Reagan et al. | 434/35 |
| 4,823,139 | 4/1989 | Eisner et al. | 342/13 |
| 4,959,015 | 9/1990 | Rasinski et al. | 342/169 X |
| 4,990,920 | 2/1991 | Sanders, Jr. | 342/15 X |
| 5,010,342 | 4/1991 | Jones, Jr. | 342/169 |
| 5,117,230 | 5/1992 | Wedel, Jr. | 342/169 |
| 5,133,663 | 7/1992 | Willingham et al. | 342/169 X |
| 5,192,208 | 3/1993 | Ferguson et al. | 342/169 X |
| 5,223,840 | 6/1993 | Cronyn | 342/170 |
| 5,228,854 | 7/1993 | Eldridge | 434/11 |

Primary Examiner—Kevin J. Teska
Assistant Examiner—Collin W. Park
Attorney, Agent, or Firm—Fishman, Dionne & Cantor

[57] ABSTRACT

A novel airborne reactive threat simulator is presented. The simulator comprises an aircraft flight and carrier qualified podded external store and a cockpit mounted system control box. The pod is capable of supersonic flight envelopes and houses a sophisticated, state-of-the-art, microprocessor controlled, programmable tracking radar system and associated data collection peripherals. The control box provides the operator/machine interface during system operation. The system operates from a library of preprogrammed scenarios, which are selected by the pilot of the aircraft during routine training/testing exercises. A threat simulation scenario is selected by the pilot as the pilot flies a predetermined profile mission against a target ship. The software routine is executed by the microprocessing system which in turn controls all system hardware components and peripherals. The executed routine orchestrates the hardware operation to produce the desired radio frequency (RF) signature emulation, which is intended to be recognized by the ship's electronic signal measurement (ESM) equipment as the threat of interest. The invention then progresses through the preprogrammed threat seeker operations of searching for, acquiring, and homing on the target vessel. The microprocessing system controls the system hardware to emulate the modes of operation, range and angle tracking loops of the threat seeker radar and provide a video display for the pilot.

46 Claims, 7 Drawing Sheets

AIRBORNE REACTIVE THREAT SIMULATOR

BACKGROUND OF THE INVENTION

This invention relates to a method and apparatus for periodically or regularly measuring the sensitivity, accuracy and effectiveness of shipboard combat vessel's electronic warfare (EW) suites, on a real time basis, at any location around the globe. More particularly, this invention relates to an airborne reactive threat simulator intended to be carried on aircraft and used to conclude the operational combat readiness of a vessel and/or to assist in the EW operational training of shipboard personnel.

Since the advent of shipboard EW equipment, a means of testing the operational readiness and effectiveness of the equipment has been a prime concern. The testing of a modern EW suite requires the utilization of a device which transmits radio frequency (RF) signatures which emulate the threat of interest, mimics the emulated threat's modes of operation (e.g., search, acquisition, track., memory), can track or home on the target (e.g., host ship) in angle and range, and has the capability to record both external (e.g., jamming signals, target return) and internal (e.g., radar parameters) information. Until now, the capability to perform these functions has been limited to assets designed for use on land based aircraft during tests normally conducted within the limits of U.S. territorial waters (e.g., Army/Navy Designation AN/ALQ-170). Conclusions drawn from these exercises are made during analysis of the resultant test data at shore based facilities, and subsequently transmitted to the affected vessel after it is on-line in potentially hostile waters. These prior art systems are large and heavy, and therefore are not well suited to be carried by a carrier based aircraft. Unfortunately, until now, no workable apparatus or methodology designed specifically for accomplishing this process within the deployed fleet/battlegroup has been perfected.

SUMMARY OF THE INVENTION

The above-discussed and other problems and deficiencies of the prior art are overcome or alleviated by the airborne reactive threat simulator of the present invention. In accordance with the present invention, an aircraft flight and carrier qualified podded external store and a cockpit mounted system control box are presented. The pod which is designed for subsonic/supersonic flight houses a sophisticated, state-of-the-art, microprocessor controlled, programmable tracking radar system and associated data collection peripherals. The control box provides the operator/machine interface during system operation. The system operates from a library of preprogrammed scenarios, which are selected by the pilot of the aircraft during routine training/testing exercises. A threat simulation scenario is selected by the pilot as the pilot flies a predetermined profile mission against a target ship. The software routine is executed by the microprocessing system which in turn controls all system hardware components and peripherals. The executed software routine orchestrates the hardware operation to produce the desired radio frequency (RF) signature emulation, which is intended to be recognized by the ship's electronic signal measurement (ESM) equipment as the threat of interest. The invention then progresses through the preprogrammed threat seeker operations of searching for, acquiring, and homing on the target vessel. The microprocessing system controls the system hardware to emulate the modes of operation, range and angle tracking loops of the threat seeker radar (and provides real time video information for display in the cockpit). Shipboard RF jamming and/or passive decoy systems activated by the target ship upon the recognition of the threat then attempt to deceive or seduce the threat seeker in range and/or angle. The impact of the jamming or the effectiveness of the passive decoys on the seeker simulation are then recorded by the data collection media in the system for post mission analysis by shipboard personnel. Direct, real time results of a particular simulation run can be determined from the cockpit video displayed and subsequently relayed by the pilot of the aircraft to the shipboard personnel, via voice communication.

As previously stated, the invention takes advantage of state-of-the-art microprocessing hardware and peripherals, allowing it to emulate multiple threats operating within the RF bandwidth of the system during a single aircraft sortie. Further, the present invention overcomes the data time lag of the prior art and allows for on-the-spot testing and evaluation of shipboard EW equipment. Also, the present invention is much lighter and more compact than prior art simulators and takes advantage of standard aircraft interfaces. This results in a simulator which is well suited to be carried on both land and carrier based aircraft, with no or minimal modification to the host aircraft.

The above-discussed as well as other features, advantages and implementations of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
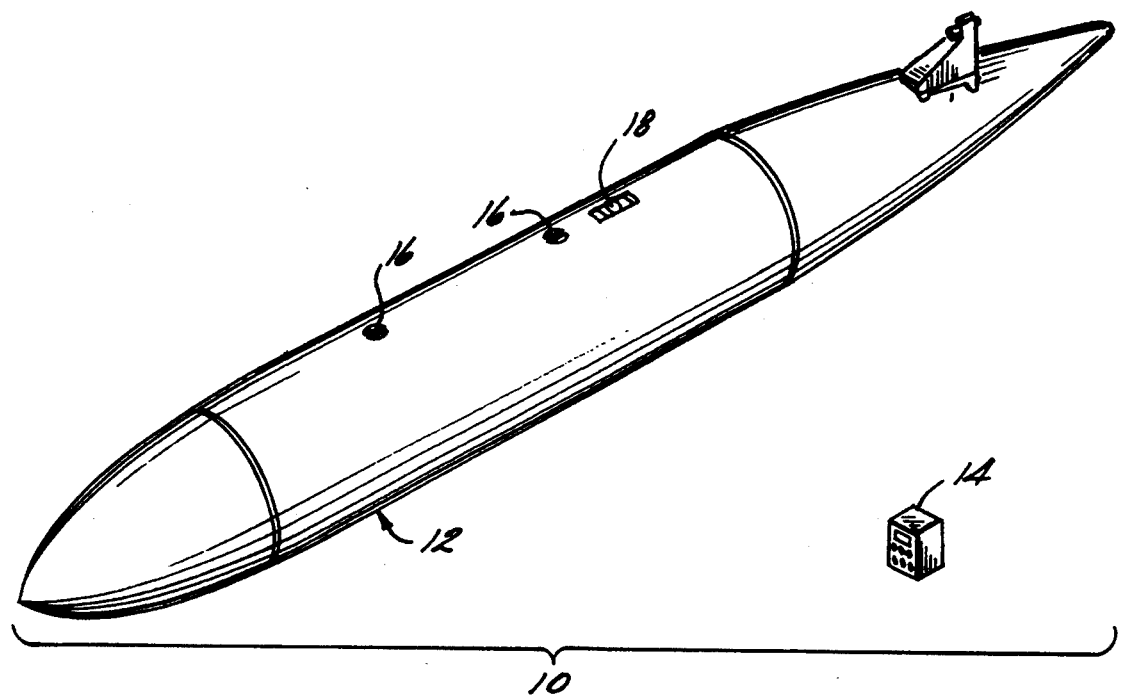
FIG. 1 is a perspective view of an airborne reactive threat simulator in accordance with the present invention.

Referring to FIG. 1, an airborne reactive threat simulator is shown generally at 10. Simulator 10 comprises a flight and carrier qualified airborne pod 12, and an aircraft cockpit operator's control box 14. Airborne pod 12 houses the system electronics (to be described hereinafter) and is attachable to a host fleet deployable aircraft (or other aircraft) mechanically by lug mounts 16 and electrically through a wiring interface panel 18. Both the mechanical and electrical interfaces are preferably as per appropriate MIL-STDS, however standard commercial practice may be employed without departing from the spirit or scope of the present invention. Pod 12 is relatively light weight and compact which makes the present invention well suited for attachment to a fleet deployable aircraft.

Figure 2:
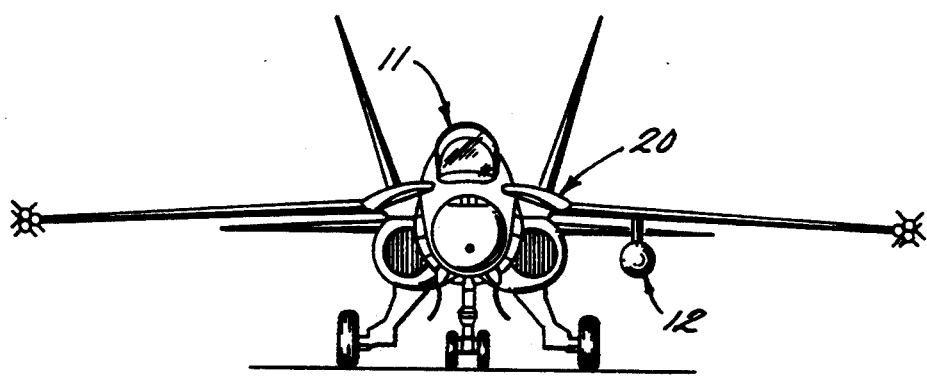
FIG. 2 is a front view of an aircraft with the airborne reactive threat simulator of FIG. 1 mounted thereon.

Referring to FIG. 2, airborne pod 12 is shown mounted for flight on a fleet deployable F/A-18 Hornet 20. While pod 12 is shown mounted to the left wing station of aircraft 20, it may alternatively be mounted on any external stores station on aircraft 20. Control box 14 is installed in the cockpit 11 of aircraft 20.

Figure 3:
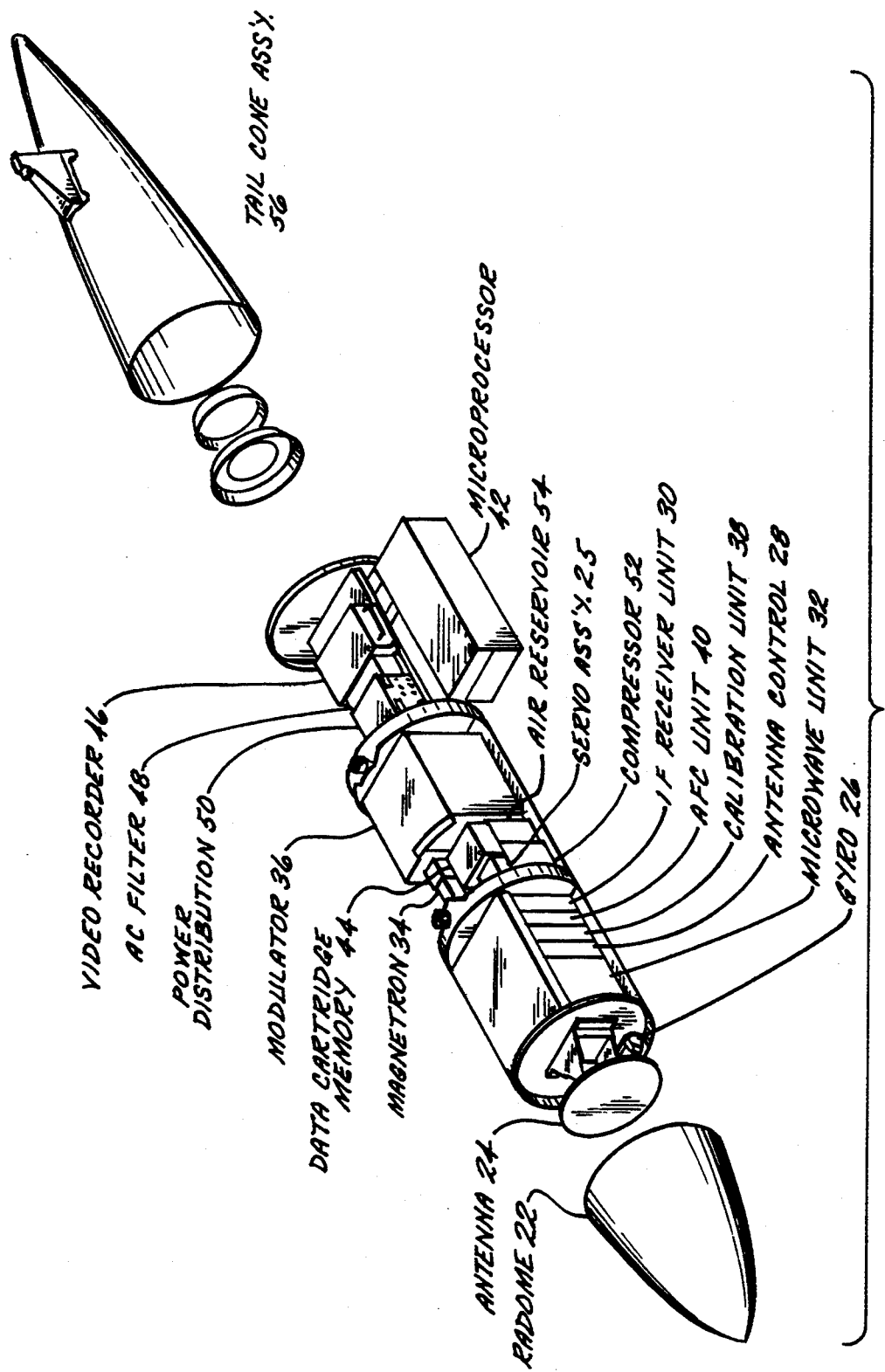
FIG. 3 is an expanded illustrative perspective view of the pod of the airborne reactive threat simulator of FIG. 1 with the outer shell removed.

Referring to FIG. 3, airborne store pod 12 is shown with its outer cover removed. Airborne store pod 12 houses a plurality of line replaceable units (LRUs) and associated system support components. Pod 12 is comprised of modular packages (e.g. LRUS) which maximizes the utilization of available space within airborne pod 12 and allows grouping of system functions in a logical fashion for ease of maintenance. This modular design will also allow for ease of changes of the electrical and mechanical design which may be required to meet future simulation requirements.

A radome 22 which is preferably a molded fiberglass unit is designed to protect an antenna 24 from the environmental elements. While radome 22 is normally fabricated with a specific frequency bandwidth, it is one of a group of frequency dependent components which as a unit can be changed to provide operation in different frequency ranges. Antenna 24 is a frequency dependent component which provides the transmission/receive media for radar operation. Antenna 24 is gimbaled and servo driven in two-axes (i.e., elevation and azimuth) by servo system 25. A platform attitude sensor 26 (i.e., a gyro) allows for antenna elevation space stabilization when required. An antenna control unit 28 controls the antenna servo system 25 and processes video information from an intermediate frequency (IF) receiver unit 30 for angle tracking.

A microwave unit 32 is a frequency dependent unit comprised of rigid waveguide and coaxial components which provide a transmit/receive path between a magnetron 34, antenna 24 and IF receiver unit 30. Magnetron 34 is a high powered RF transmission device which is frequency tunable via a servo mechanism controlled by servo assembly 25. Magnetron 34 is frequency dependent and produces a plurality of RF pulses which are required for radar operation. A modulator 36 is used to bias magnetron 34, thus providing RF pulse width control. A calibration unit 38 contains the components necessary to conduct calibration routines which provide pre/post mission analysis of system operation or can be used as a maintenance tool. An automatic frequency control (AFC) unit 40 is comprised of RF oscillators which cover multiple frequency bands and the circuitry required for automatic frequency control of receiver operations. The RF oscillators provide outputs to both the calibration unit 38 for calibration target generation and to the microwave unit 32 for use as a receiver local oscillator. A microprocessor unit 42 is preferably comprised of but not limited to five microprocessors and their associated custom hardware cards, each of which is dedicated to controlling a specific functional group of LRUs within the system (e.g. transmitter, receiver and data acquisition).

A data acquisition subsystem is comprised of a data cartridge memory unit 44 and a video recorder 46 (preferably a VHS format video recorder). These units are used to record both internal and external data on a real time basis. The recorded data is analyzed after a mission to determine the invention's operating mode and performance, evaluate target return and measure the invention's response to jamming and/or passive decoys.

An AC filter unit 48 and a power distribution unit 50 are used to filter the aircraft supplied AC power required for system operation and distribute and monitor both AC and DC power to the LRUs. An air compressor 52 and an air reservoir 54 support system operation by providing compressed, regulated, dehydrated air to modulator 36 and microwave unit 32 in order to prevent arcing at high altitudes or RF frequencies. A tail cone assembly 56 is designed to protect the area aft of the last bulkhead and provide pod 12 with jettison capabilities particular to the F/A-18 aircraft. The area enclosed by tail cone 56 is designated for a known type environmental control unit (ECU) 60 (FIG. 4) which will provide system cooling at supersonic speeds.

Figure 4:
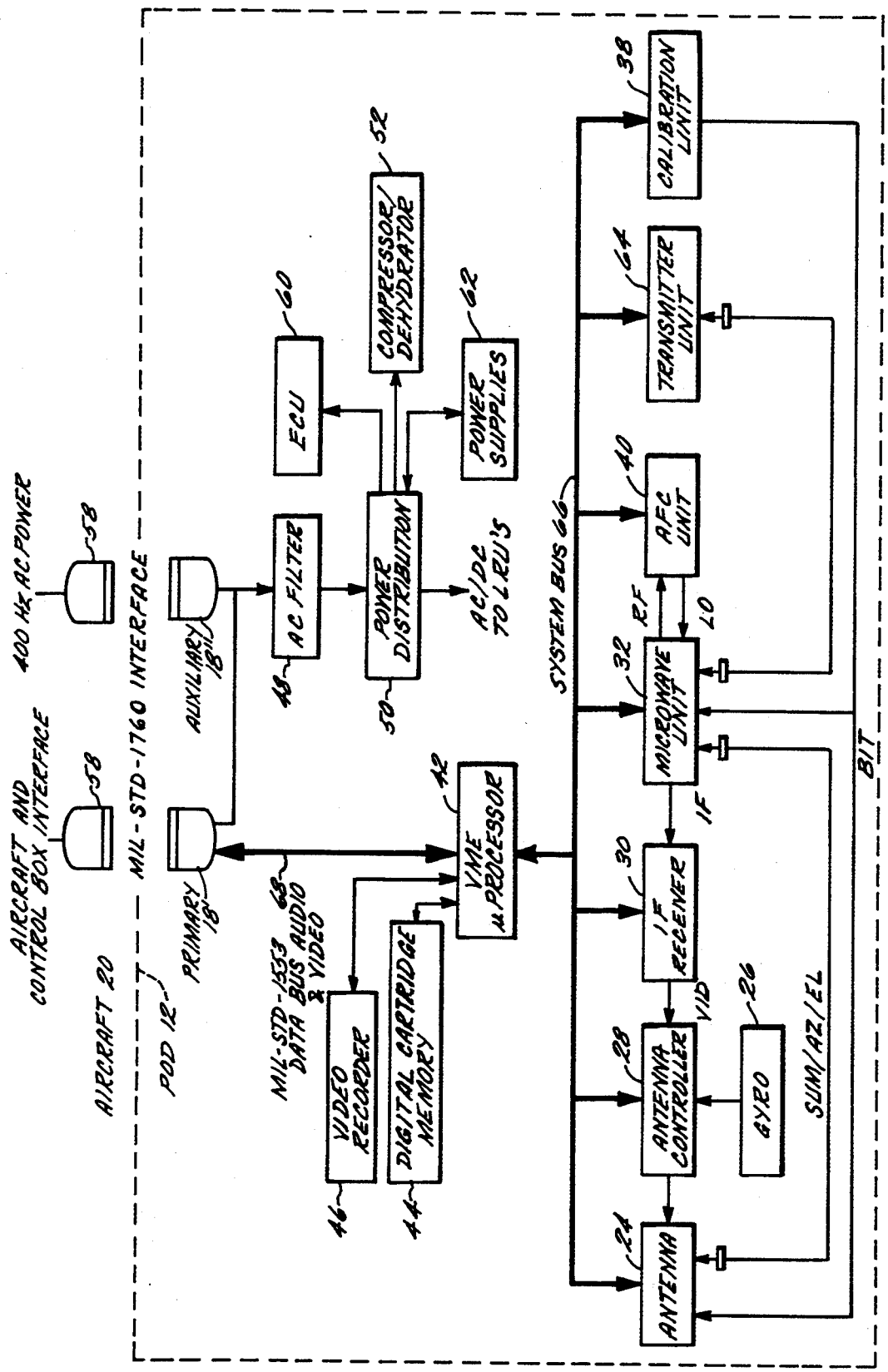
FIG. 4 is a block diagram of the electronics used in the airborne reactive threat simulator of FIG. 1.

Referring to FIG. 4, aircraft data, control and power interfaces are preferably provided to the system via MIL-STD 1760 (which is expressly incorporated herein by reference) specified connectors inherent to all fleet deployable aircraft. The interface is comprised of two electrical connectors 18, a primary connector 18' which carries power as well as video and data signals via a MIL-STD 1553B (which is expressly incorporated herein by reference) aircraft bus configuration and an auxiliary connector 18" which supplies additional power and current handling capabilities for support of the environmental control unit 60. Connectors 18 mate with corresponding connectors 58 on aircraft 20.

The input power from aircraft 20 is filtered to remove noise by AC filter assembly 48 and then presented to power distribution unit 50. Power distribution unit 50 distributes the power to the system LRUs and support units as required. Power distribution unit 50 also distributes DC power generated by power supplies 62 to the system LRUs.

The operator's cockpit control box 14 (FIG. 1) is used by the pilot of the aircraft to power the system on/off, select the desired threat simulation to be executed or make parametric changes to an operating simulation. This system on/off signal controls power distribution unit 50. Simulations are selected by the pilot via direct communications between the control box 14 and microprocessor 42. Microprocessor unit 42 incorporates data storage media (preferably hard and floppy disc drives), to store preprogrammed algorithms and parametric information which orchestrate the following hardware components; antenna 24, microwave unit 32, antenna controller 28, calibrations unit 38, AFC unit 40, IF receiver 30 and a transmitter unit 64 to accurately emulate the desired threat. Transmitter unit 64 comprises magnetron 34 and modulator 36.

The system's hardware components are designed to be broadband in nature. This allows for the emulation of numerous simulations which can be specifically tailored within the bandwidth of the system. As the system hardware operates, microprocessor unit 42 monitors a system bus 66 and acquires the information considered pertinent for analysis operations. Microprocessor unit 42 formats the acquired data for storage on either the digital cartridge memory unit 44 or video recorder 46. Aircraft flight information and pilot/ship voice communications data are also acquired by microprocessor unit 42 via a bus 68 (preferably MIL-STD-1553 bus which is expressly incorporated herein by reference) and subsequently recorded on the storage media 44 and 46.

Figure 5:
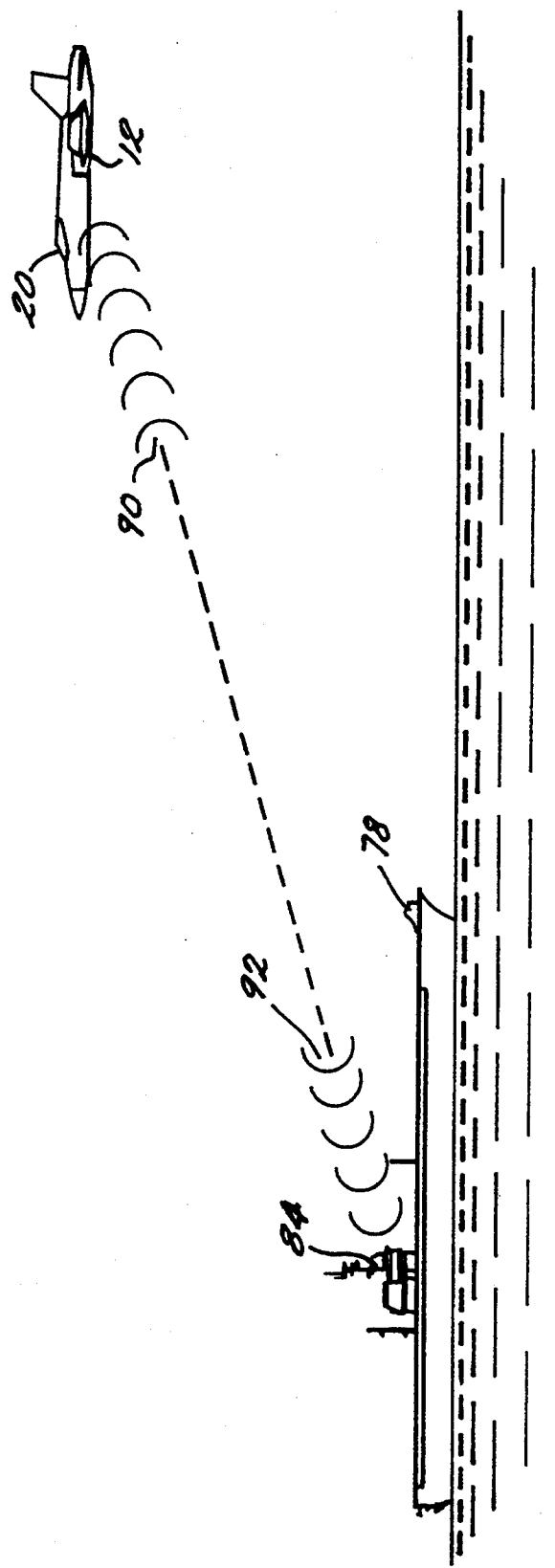
FIG. 5 is a view of an aircraft and a carrier using the airborne reactive threat simulator of FIG. 1.
Figure 6:
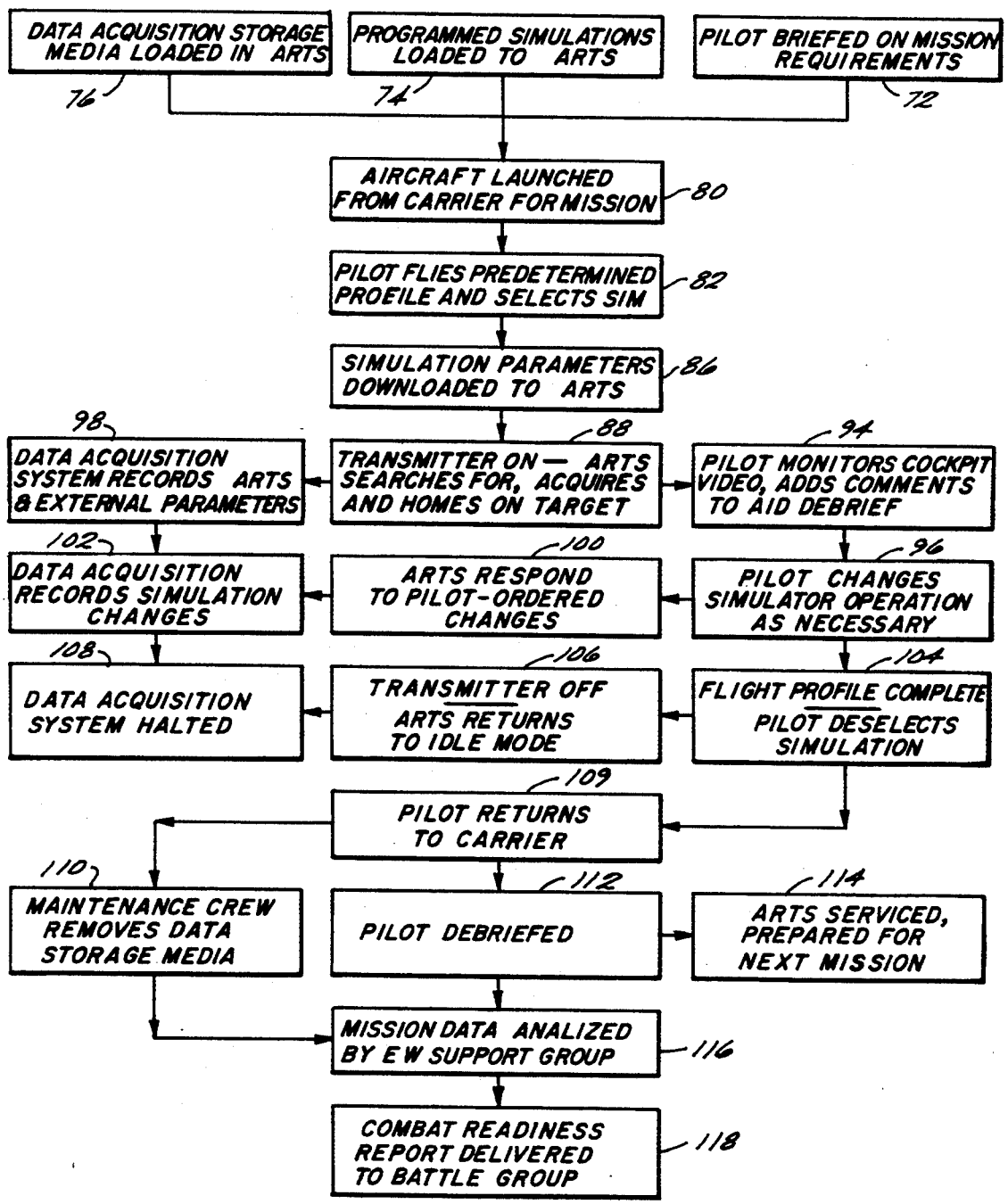
FIG. 6 is a flow diagram of an application of the airborne reactive threat simulator of FIG. 1 used to test and evaluate shipboard EW in accordance with the present invention.

Referring to FIGS. 5 and 6, an operational scenario for the airborne reactive threat simulator 10 (ARTS) of the present invention will now be described. First, a pilot is briefed on mission requirements, indicated at 72. Also, airborne pod 12 is programmed with the simulations to be run during the mission as indicated at 74, and mounted on aircraft 20. The data acquisition storage media (e.g., VHS tape and digital cartridge memory as described hereinbefore) are loaded into digital cartridge memory 44 and video recorder 46, as indicated at 76. Aircraft 20 is then launched from a carrier 78, as indicated at 80. Simulator 10 is used to simulate antiship cruise missile threats or the platforms which carry them and to subsequently provide a measure of a surface combatant's ability to recognize and counter these threats. The pilot of aircraft 20 flies a predetermined profile, indicated at 82, similar to that of the threat of interest while working with the battlegroup or an individual ship (e.g., carrier 78). Any of a number of threat simulations within a particular RF frequency will be available for selection by the pilot during a single sortie from the programmed microprocessor 42. Once in position, the pilot of aircraft 20 selects via the operator's control box 14 the simulation desired by the combat information center (CIC) 84 onboard carrier 78., as also indicated at 82. These selected control signals are then downloaded to pod 12 (described hereinbefore), as indicated at 86.

Simulator 10 searches for, acquires and homes in on a target as described below and indicated at 88. When the simulation is executed, pod 12 generates and transmits an RF signature 90 of the threat which is subsequently detected and identified by the ship's electronic warfare (EW) equipment (not shown). The identified threat causes the shipboard EW equipment to generate and transmit an RF jamming and/or passive decoy response 92. The pilot monitors the cockpit video and provides comments to aid at debriefing, as indicated at 94. Further, the pilot reacts to this information to provide simulator changes as necessary, which is indicated at 96. During operation simulated and external parameters are stored at digital cartridge memory 44 and video recorder 46, as indicated at 98. Accordingly, while tracking the target of interest (e.g., the ship under test), the invention responds to, records and measures the effects of RF jamming, and passive decoy countermeasures on the range and angle tracking loops-of the emulated threat (as described hereinbefore) for post mission analysis. If commanded simulator 10 responds to the pilots changes, as indicated at 100, and the results of these changes are also recorded at digital cartridge memory 44 and video recorder 46, as indicated at 102. Once the flight profile is complete, the pilot deselects simulation via control box 14, as indicated at 104. Simulator 10 is then powered down and returns to an idle mode wherein data is no longer recorded, as indicated at 106 and 108.

Upon completion of the mission, aircraft 20 returns to carrier 78 and the recorded test data is removed from pod 12 and reduced for analysis, as indicated at 109 and 110. The pilot is then debriefed, as indicated at 112, and pod 12 is serviced and/or prepared for another mission, as described above and indicated at 114. The mission data and pilot debriefing information is then analyzed by the EW support group and the combat readiness of the tested ship or battlegroup evaluated, as indicated at 116 and 118.

Using the method described above, the ship's company can at any deployed location, determine on short notice, the ship's EW suite's ESM receiver sensitivity, threat recognition accuracy and jamming effectiveness. Additionally these exercises can provide regular at sea training for shipboard EW equipment operators and CIC personnel.

Figure 7:
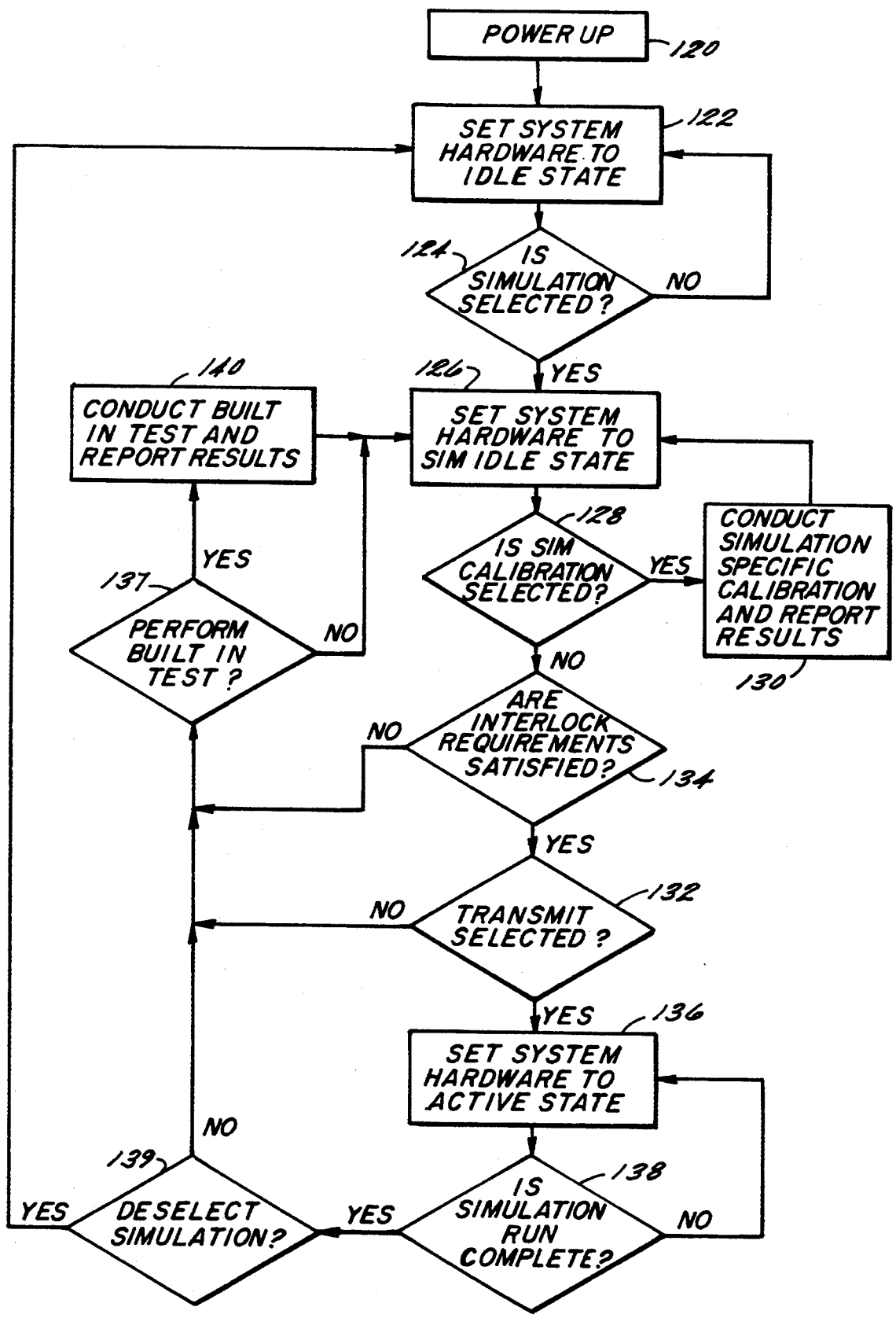
FIG. 7 is a flow diagram of the operation of the airborne reactive threat simulator of FIG. 1.

Referring now to FIG. 7, a flow diagram of the operation of the invention is presented. After aircraft 20 has launched from carrier 78 (as described hereinbefore), the pilot/operator powers the system on, as indicated at 120. At this point microprocessor 42 is booted, the operational or background software loaded and executed and the hardware is set to the idle state, as indicated at 122. The idle mode of operation can be compared to the on mode of a personal computer, where the operating system of the computer is controlling all of the system functions but no applications software is executed. The hardware during the idle mode is programmed to a set of static, benign parameters designed to set the stage for the application of simulation specific software execution. When the pilot selects from the menu of programmed simulations a specific application, as indicated at 124, the software for that simulation is downloaded to microprocessor 42 and the system hardware is set to the simulation idle mode (SIM), as indicated at 126. In this state, the hardware is set to a condition which emulates the hardware configuration of the simulated system. From this point, the operator can either select an internal calibration routing or fully execute the simulation by activating the high power RF transmitter 64. If the operator selects a simulation specific calibration, as indicated at 128, microprocessor 42 executes a program, indicated at 130, using the same algorithms the system would use if it were operating into free space. During the calibration process, the system emulates a transmitted signal and a target return by means of the internal calibration unit (ICU) 38, described hereinbefore. The emulated target return generated by ICU 38 is injected directly into the receiver path and the system acquires and tracks on the signal as if it were a return from an actual transmitted pulse. As the emulated target is tracked, the power level is varied and the resulting simulator response to the changes recorded (as described hereinbefore). This calibration process is used to establish the baseline system sensitivity which is subsequently used to analyze the mission data.

The operator can forego a simulation calibration and instead opt for executing the actual system operation by selecting a transmit condition, as indicated at 132. Actual transmitter operation is only possible if all the failsafe and mission critical interlocks requirements are satisfied, indicated at 134. In this mode, microprocessor 42 sets the hardware to a state referred to herein as a SIM active state, indicated at 136, and the simulation goes through the process of searching for, acquiring and homing on the target in range and angle (as described hereinbefore). A more detailed explanation of this process is given with reference being made to FIG. 8 hereinafter. Referring to the interlock requirements 134 and transmit select 132, another operation which can be chosen is a built-in test routine, indicated at 137. This operation is generally reserved for use when a fault which prohibits transmit and subsequently the SIM active state 136 occurs. However, if the simulation routine is not executed properly or fails to perform as per the mission requirement the built-in test routine 137 can also be selected. The built-in test routine 137 is selected by completing the simulation run, as indicated at 138, and deselecting simulation, as indicated 139. Once selected, the built-in test routine 137 checks operation via a known set of preprogrammed parameters. By checking each of these known parameters and looking for conditions which do not conform with the expected results, the built-in test routine 137, can isolate a problem area and report the results to the operator, as indicated at 140. At the completion of the built-in test routine 137, or the simulation execution (described above), the operator can deselect the simulation, as indicated at 139, and return to the system idle state 122. It will be appreciated that while an orderly power down for the system idle state 122 is recommended, power down can be accomplished at anytime during the process.

Figure 8:
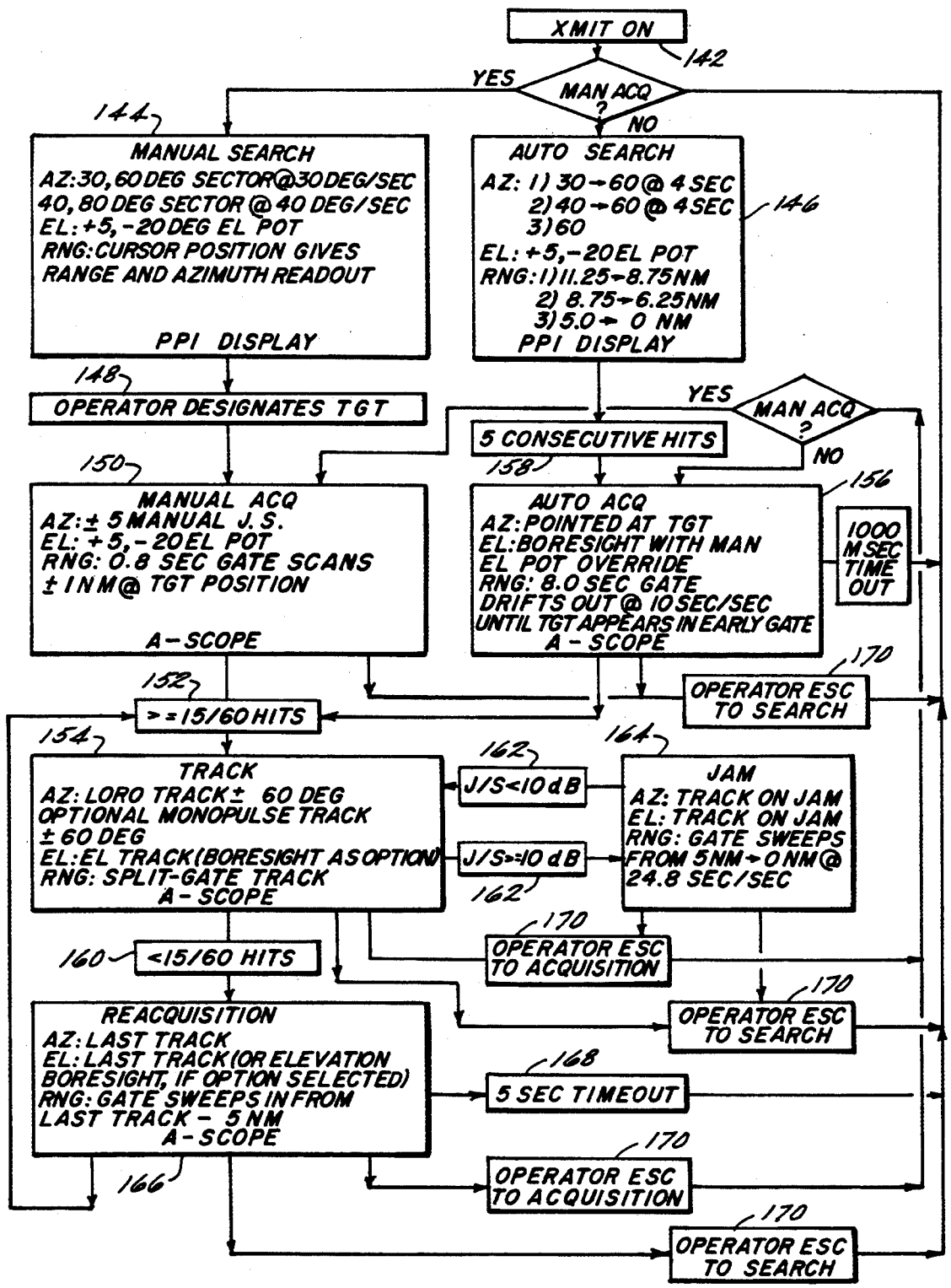
FIG. 8 is a flow diagram of the simulation specific software operation used in the operation of the airborne reactive threat simulator of FIG. 7.

Referring to FIG. 8, an example of a software flow diagram for the simulation active state identified hereinabove is presented. The software preferably operates and controls system hardware in a manner which best emulates the actual system being simulated. It will be appreciated that the present invention functions as a programmable tracking radar system which is versatile in its application. All simulations employed by the present invention will preferably have a flow diagram similar to the example shown in FIG. 8. Any difference between simulations will depend upon the mode of operation (e.g., search, acquisition, track, jam and reacquisition) and the parametric values programmed.

The software which was loaded during the SIM idle state 126 is now executed by the microprocessor 42. In the SIM active state 136 to be described hereinafter, the hardware is configured to generate and transmit the RF signature which would emulate that of the seeker. These parameters include transmit frequency, pulse width, pulse repetition frequency (PRF), transmit power level and, may also include a PRF jitter or stagger pattern. Internal parameters to be configured include range and angle track technique, IF Bandpass width, sensitivity timing control (STC) levels and time constant, automatic gain control (AGC) threshold and time constant, receiver sensitivity, gate structure timing and widths and threshold levels for target detection and mode transitions.

Once transmit on 142 is selected, the hardware is set to emulate the system of interest and the basic algorithms which dictate the modes of operation begin to control the system as it first searches for an acceptable target. There are two methods by which search can be accomplished: 1) a manual search 144 or 2) an automatic search 146. If manual search 144 is selected, the operator has control of both the positioning of antenna 24 and the range gate via controls located on control box 14. Search angle sectors in azimuth and elevation and range search areas are controlled by preprogrammed limits. The operator then manually searches for a target by using the controls at his disposal and viewing the radar video display in the cockpit. When the operator selects a target of interest 148, an acquisition mode 150 is initiated. In the manual acquisition mode 150, the programmed limits are designed to focus antenna 24 and range gate control around the target of interest. In addition, target hit counters 152 are brought into play to assure the return selected for acquisition is a valid radar target. If hit counter 152 is satisfied, the radar then transitions to an automatic track 154. This point in the operational sequence is common to either of the manual or automatic search and acquisition operations. If automatic search 146 is selected, an automatic program runs the aforementioned steps without the operator in the loop. The transition from auto search 146 to an auto acquisition 156 is determined by an automatic hit counter 158. As with the manual operations 144 and 150, auto search 146 and auto acquisition 156 have preprogrammed limits of control.

When automatic track 154 has been achieved the system acts as a tracking radar emulating the seeker system of the simulated threat. The type of range and angle track technique, track gate structure and other pertinent parametric values are preprogrammed. The system will remain in automatic track provided a track hit counter 160 and a jamming detector 162 are satisfied. If jamming detector 162 is not satisfied, the operation detects a jamming signal and automatically switches to a jamming mode 164 which will stay in effect until the jamming signal is removed at which point the system returns to automatic track 154. If during automatic track 154, the track hit counter 160 is not satisfied, the operation automatically switches to a reacquisition mode 166. In reacquisition mode 166, the system attempts to reacquire the target using the last known track position as a reference point. If after a preprogrammed time period 168, the target is not reacquired, the simulation operation automatically returns to either the manual or auto search mode 144, 146. If, however, before timeout period 168 has expired, target hit counter 152 is satisfied the program returns to track 154. At any point during the operation the operator can interrupt the mode in progress and escape (to a previous mode), as indicated at 170. The nomenclature used in the flow chart of FIG. 8 is provided in Table 1 below:

TABLE 1

NOMENCLATURE

ACQ = Acquisition
A-scope = Target video vs. Time display
AZ = Azimuth
DEG = Degree
EG = Early Gate
EL = Elevation
ESC = Escape
HC = Hit Counter
JS = Joystick
J/S = Jam to Signal Ratio
LORO = Lobe on Receive Only
MAN = Manual
NM = Nautical Mile
MSEC = Millisecond (Time)
OPX = Option X
POT = Potentiometer
PPI Display = Planned Position Indicator
RNG = Range
SCH = Search
SEC = Second (time)
TGT = Target
XMIT = Transmit
@ = At, About It will be appreciated that an important feature of the present invention is that simulator 10 is much lighter and more compact than prior art simulators. Accordingly, simulator 10 is well suited to be mounted to a fleet deployable or land based aircraft. Further, the present invention overcomes the data time lag of the prior art and allows for on-the-spot testing and evaluation of shipboard EW equipment. It will be appreciated that while the above description is directed to a threat simulation system for at sea conditions, the system of this invention is readily adapted to land base use and such is contemplated by the present invention. While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An airborne reactive threat simulator for use with an aircraft during flight, comprising:
   control means for allowing aircraft personnel to select a programmed scenario and generating control signals indicative of said selected programmed scenario, said control means being adapted for disposal within the aircraft;
   pod means having mounting means for mounting to the aircraft;
   signal processor means disposed within said pod means, said signal processor means being responsive to said control signals, data signals and video data signals, said signal processor means having memory means for storing signals including (1) signals defining an executable algorithm for providing reactive signals indicative of said selected programmed scenario and (2) said data signals;
   transmitter means disposed within said pod means, said transmitter means generating an emulated radio frequency signature in response to said reactive signals, said emulated radio frequency signature simulating an airborne reactive threat;
   receiver means disposed within said pod means, said receiver means receiving radio frequency energy transmitted from a target and generating said data signals and said video data signals indicative of the received radio frequency energy, said data signals and said video data signals being presented to said signal processor means, said radio frequency energy emulating a response from the target to the simulated airborne reactive threat; and
   video recorder means disposed within said pod means, said video recorder means storing said video data signals.

2. The simulator of claim 1 wherein said transmitter means and said receiver means in combination comprise:
   magnetron means for producing a plurality of radio frequency pulses in response to said reactive signals;
   modulator means for controlling pulse width of said radio frequency pulses;
   antenna means being responsive to said radio frequency pulses for transmitting said emulated radio frequency signature, said antenna means receiving said radio frequency energy to provide receive signals;
   intermediate frequency receiver means being responsive to said receive signals for generating said data signals and said video data signals;
   automatic frequency control means for tuning said intermediate frequency receiver means; and
   means for directing communication between said antenna means and said magnetron means during transmitting, and between said antenna means and said intermediate frequency receiver means during receiving.

3. The simulator of claim 2 further comprising:
   gimbal means for allowing said antenna means to move in multiple directions.

4. The simulator of claim 3 further comprising:
   antenna control means for controlling a direction of said antenna means.

5. The simulator of claim 4 further comprising:
   servo means for positioning said antenna means in response to said antenna control means.

6. The simulator of claim 4 further comprising:
   attitude sensor means for determining a relative position of said simulator and generating a position signal indicative thereof, said position signal being presented to said antenna control means, wherein said antenna control means is responsive to said position signal.

7. The simulator of claim 2 further comprising:
   radome means disposed at one end of said pod means for protecting said antenna means, said radome means having a frequency bandwidth compatible with the frequency of said transmitted emulated radio frequency signature and said received radio frequency energy at said antenna means.

8. The simulator of claim 7 wherein said radome means is comprised of fiberglass.

9. The simulator of claim 1 wherein said pod means is mounted to an external stores station of an aircraft.

10. The simulator of claim 9 wherein said external stores station is a wing station.

11. The simulator of claim 1 wherein the aircraft is a fleet deployable aircraft.

12. The simulator of claim 11 wherein the fleet deployable aircraft is a F/A-18 Hornet.

13. The simulator of claim 1 wherein said control means is located in the cockpit of the aircraft.

14. The simulator of claim 1 wherein said pod means comprises:
   an elongated cylinder;
   a tail cone disposed at one end of said elongated cylinder; and
   a radome disposed at the other end of said elongated cylinder.

15. The simulator of claim 1 further comprising:
   environmental control means for providing cooling for said signal processor means, said transmitter means and said receiver means.

16. The simulator of claim 1 wherein said flight includes supersonic flight.

17. A method for simulating a threat from an aircraft during flight, the method comprising the steps of:
   selecting a programmed scenario to provide control signals indicative of said selected programmed scenario, using control means adapted for disposal within the aircraft;
   processing said control signals, data signals and video data signals, using signal processing means disposed in pod means having mounting means for mounting to the aircraft;
   storing signals including programmed signals defining an executable algorithm to provide reactive signals indicative of said selected programmed scenario;

storing said data signals using memory means disposed in said pod means;

transmitting an emulated radio frequency signature in response to said reactive signals, using transmitter means disposed in said pod means, said emulated radio frequency signature simulating an airborne reactive threat;

receiving radio frequency energy transmitted from a target to provide said data signals and said video data signals indicative of the received radio frequency energy, using receiver means disposed in said pod means, said radio frequency energy emulating a response from the target to the simulated airborne reactive threat; and storing video data signals, using video recorder means disposed in said pod means.

18. The method of claim 17 wherein said step of transmitting and said step of receiving in combination comprise:

producing a plurality of radio frequency pulses in response to said reactive signals, using magnetron means;

controlling pulse width of said radio frequency pulses, using modulator means;

transmitting said emulated radio frequency signature using antenna means, said antenna means being responsive to said radio frequency pulses, and receiving said radio frequency energy using said antenna means to provide receive signals;

generating said data signals and said video data signals from said receive signals, using intermediate frequency receiver means;

tuning said intermediate frequency receiver means, using automatic frequency control means; and directing communication between said antenna means and said magnetron means during transmitting, and between said antenna means and said intermediate frequency receiver means during receiving.

19. The method of claim 18 further comprising the step of:

allowing said antenna means to move in multiple directions, using gimbal means.

20. The method of claim 19 further comprising the step of:

controlling a direction of said antenna means, using antenna control means.

21. The method of claim 20 further comprising the step positioning said antenna means in response to said antenna of: control means, using servo means.

22. The method of claim 20 further comprising the step of:

determining a relative position of said simulator and generating a position signal indicative thereof, wherein said antenna control means is responsive to said position signal.

23. The method of claim 18 further comprising the step of:

protecting said antenna means using radome means, said radome means disposed at one end of said pod means, said radome means having a frequency bandwidth compatible with the frequency of said transmitted emulated radio frequency signature and said received radio frequency energy at said antenna means.

24. The method of claim 23 wherein said radome means is comprised of fiberglass.

25. The method of claim 17 wherein said pod means is mounted to an external stores station of an aircraft.

26. The method of claim 25 wherein said external stores station is a wing station.

27. The method of claim 17 wherein the aircraft is a fleet deployable aircraft.

28. The method of claim 27 wherein the fleet deployable aircraft is a F/A-18 Hornet.

29. The method of claim 17 wherein said control means is located in the cockpit of the aircraft.

30. The method of claim 17 wherein said pod means comprises:

an elongated cylinder;

a tail cone disposed at one end of said elongated cylinder; and a radome disposed at the other end of said elongated cylinder.

31. The method of claim 17 further comprising the step of:

providing cooling for said signal processor means, said transmitter means and said receiver means, using environmental control means.

32. The method of claim 17 wherein said flight includes supersonic flight.

33. A method for simulating a threat from an aircraft during flight, the method comprising the steps of: simulating a threat from the aircraft during flight, said step of simulating a threat comprising, generating an emulated signature signal indicative of the threat, and transmitting said emulated signature signal at a target, wherein the target generates a counter signal in response to said emulated signature signal detected by the target;

receiving said counter signal at the aircraft;

homing on said counter signal at the aircraft; and storing signals including said emulated signature signal and said counter signal for simulation evaluation.

34. The method of claim 33 wherein said emulated signature signal comprises an emulated radio frequency signature signal.

35. The method of claim 33 wherein the target comprises a ship under test.

36. The method of claim 35 wherein the ship comprises an aircraft carrier from which the aircraft was launched.

37. The method of claim 33 wherein the threat comprises an antiship cruise missile threat.

38. The method of claim 33 further comprising the step of:

adjusting said emulated signature signal in response to said received counter signal.

39. The method of claim 33 wherein said flight includes supersonic flight.

40. An airborne reactive threat simulator for use with an aircraft during flight, comprising:

simulator means for simulating a threat, said simulator means having mounting means for mounting to the aircraft, said simulator means comprising, means for generating an emulated signature signal indicative of the threat, and means for transmitting said emulated signature signal at a target, wherein the target generates a counter signal in response to said emulated signature signal detected by the target;

receiver means for receiving said counter signal at the aircraft;

means for homing on said counter signal at the aircraft; and means for storing signals including said emulated signature signal and said received counter signal for simulation evaluation.

41. The simulator of claim 40 wherein said emulated signature signal comprises an emulated radio frequency signature signal.

42. The simulator of claim 40 wherein the target comprises a ship under test.

43. The simulator of claim 42 wherein the ship comprises an aircraft carrier from which the aircraft was launched.

44. The simulator of claim 40 wherein the threat comprises an antiship cruise missile threat.

45. The simulator of claim 40 further comprising:
means for adjusting said emulated signature signal in response to said received counter signal.

46. The simulator of claim 40 wherein said flight includes supersonic flight.

* * * * *